Figure 1:
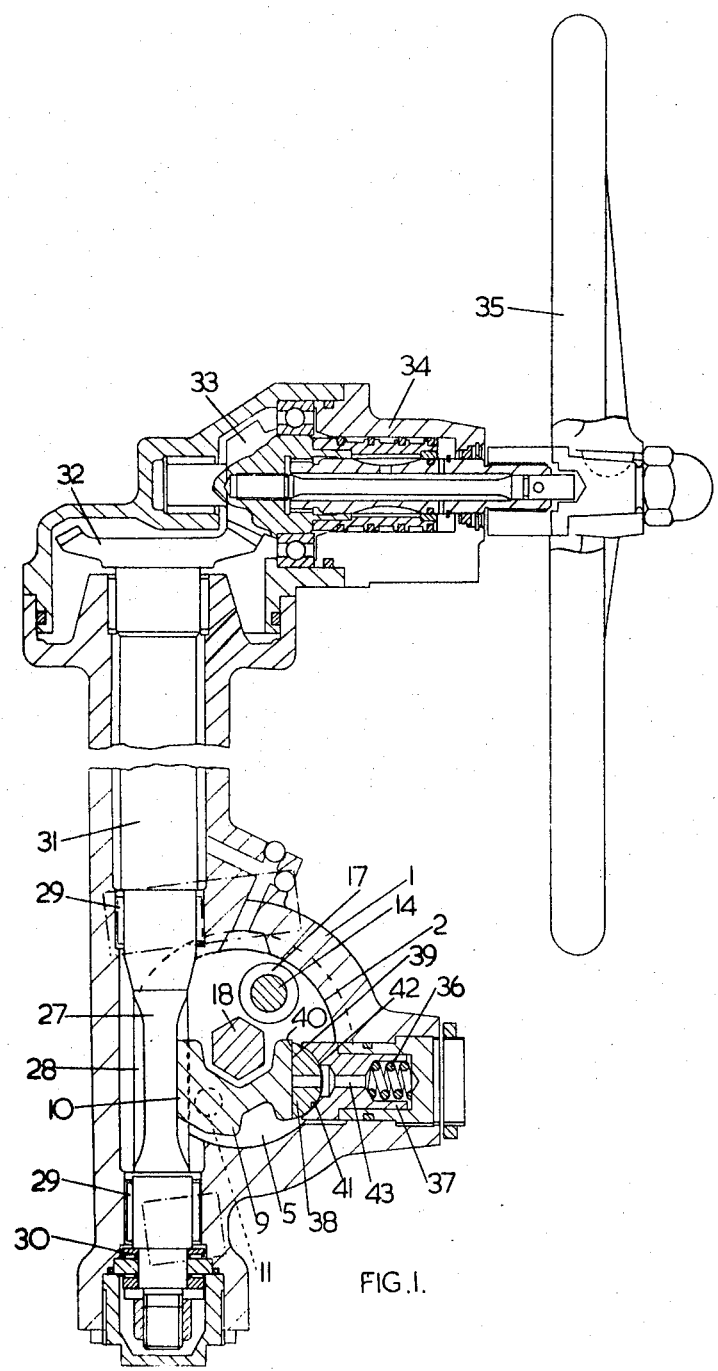

United States Patent [19]

Millard

[11] 3,756,340
[45] Sept. 4, 1973

[54] POWER-ASSISTED RACK-AND-PINION STEERING MECHANISM FOR MOTOR VEHICLES
[75] Inventor: Barry John Millard, Reading, England
[73] Assignee: Adwest Engineering Limited, Reading, England
[22] Filed: May 3, 1972
[21] Appl. No.: 249,780

[30] Foreign Application Priority Data
Mar. 21, 1972 Great Britain.................. 13,222/72

[52] U.S. Cl................. 180/79.2 R, 74/498, 92/136, 280/96
[51] Int. Cl............................ B62d 3/12, B62d 5/06
[58] Field of Search.................. 180/79.2 R; 280/96; 92/136; 74/422, 498

[56] References Cited
UNITED STATES PATENTS
2,053,272  9/1936  Eaton............................. 180/79.2 R
3,352,170  11/1967  Adams............................. 74/498 X
3,680,443  8/1972  Jenvey............................. 92/136 X Primary Examiner—Leo Friaglia
Assistant Examiner—Leslie J. Paperner
Attorney—Larson, Taylor & Hinds

[57] ABSTRACT

A power-assisted rack-and-pinion steering mechanism for a motor vehicle, the mechanism comprising a housing, a pinion rotatably mounted in the housing and adapted for connection to the steering control of a motor vehicle for rotation thereby, a rack assembly reciprocable within the housing and adapted for connection to the steerable road wheels of a motor vehicle to impart steering thereto, the rack assembly comprising two pistons spaced from one another and a toothed rack pivotally mounted eccentrically of said pistons, the rack assembly being free to rotate about the axis of the pistons to engage the teeth of the toothed rack with the pinion and the toothed rack being free to pivot about an axis parallel with the axis of the pistons to ensure proper meshing of the teeth of the toothed rack with the teeth of the pinion, and means urging the toothed rack into engagement with the pinion.

12 Claims, 2 Drawing Figures

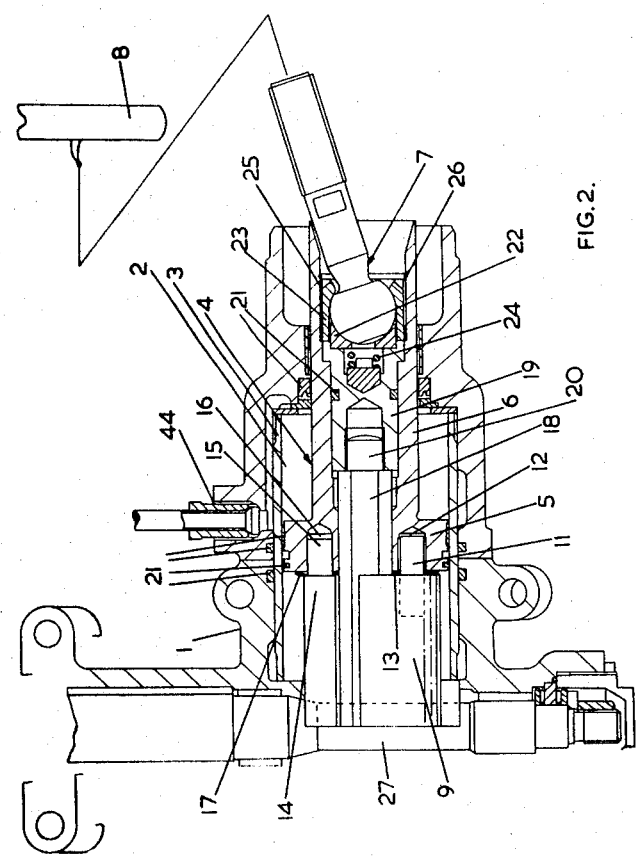

POWER-ASSISTED RACK-AND-PINION STEERING MECHANISM FOR MOTOR VEHICLES

This invention relates to power-assisted rack-and-pinion steering mechanisms for motor vehicles.

In cases where it is desired to install a rack-and-pinion steering mechanism in a large-size motor vehicle, e.g., in a truck or bus, the size of toothed rack necessary to withstand the working loads gives rise to difficulties in machining the rack and in maintaining proper meshing engagement between the rack and the pinion. The present invention has as its object to provide a mechanism wherein the toothed rack can be of lighter construction and wherein proper meshing engagement between the rack and the pinion can be ensured.

To this end the present invention provides a power-assisted rack-and-pinion steering mechanism for a motor vehicle, the mechanism comprising a housing, a pinion rotatably mounted in the housing and adapted for connection to the steering control of a motor vehicle for rotation thereby, a rack assembly reciprocable within said housing and adapted for connection to the steerable road wheels of a motor vehicle to impart steering thereto, the rack assembly comprising two pistons spaced from one another and a toothed rack mounted between said pistons, the rack assembly being rotatable about the axis of said pistons to engage the teeth of the toothed rack with the pinion and the toothed rack being rotatable about an axis parallel with the axis of the pistons to align the teeth of the toothed rack with the teeth of the pinion, and means urging the toothed rack into engagement with the pinion.

Preferably the toothed rack is capable of limited axial movement relative to said pistons. To this end a thrust washer may be interposed between each of said pistons and the toothed rack. The toothed rack may be pivotally connected to each of said pistons by way of a pivot pin inserted into a bore in the piston. Said pivot pins may be integral with the toothed rack or may be separate therefrom and may be inserted into bores in the ends of the toothed rack.

A balancing bar may extend between the pistons, the balancing bar being located diametrically opposite the toothed rack. A thrust washer may be interposed between each piston and the balancing bar. The balancing bar may be pivotally connected to the pistons by way of a pivot pin inserted into a bore in the piston.

A tie bar may be provided which connects the pistons together.

Each piston may have a piston rod associated therewith, the piston rods extending in opposite directions and being adapted for connection to the steerable road wheels of a motor vehicle. The piston rods may be hollow and said tie bar may extend through the pistons and the piston rods and may have a nut threaded thereon at each end thereof, each of said nuts being housed in a counterbore in that end of a piston rod opposite its associated piston. The tie bar and piston rods are preferably sufficiently robust to absorb a large proportion of the working loads to which the steering mechanism will be subjected in use, thus enabling the toothed rack to be of considerably lighter construction than would otherwise be the case.

That end of each piston rod remote from its associated piston may house a universal joint whereby the rack assembly is adapted for connection to the steerable road wheels of a motor vehicle.

The said tie bar preferably extends substantially centrally of the pistons. The tie bar may be formed from standard bar stock of suitable cross-sectional configuration, e.g., bar stock of hexagonal, square or circular cross-sectional configuration. The toothed rack may have a cross-sectional configuration such that it partially embraces the tie bar.

The means urging the toothed rack into engagement with the pinion may comprise spring means, e.g., a spring-loaded pad. The spring-loaded pad may have a planar face portion which engages a face portion of the toothed rack and the pad may be adjustably mounted so as to maintain the planar face portion thereof in face-to-face engagement with the face portion of the toothed rack. Thus the pad may have a substantially hemispherical seat portion which is received in a complementary seating of a support member. A helical compression spring may be interposed between the support member and the said housing.

In order that the invention may be the more readily understood, reference will hereinafter be made, by way of example, to the accompanying drawings, in which:

FIG. 1 is a cross-sectional elevation of a power-assisted steering mechanism according to the present invention, and FIG. 2 is a longitudinal sectional view showing one half of the mechanism of FIG. 1. The other half of the mechanism corresponds, the mechanism being symmetrical about the vertical centre line marked A in FIG. 2.

The steering mechanism illustrated comprises a housing 1 defining a cylinder 2 having a cylinder lining 3. Reciprocable within the cylinder 2 is a rack assembly 4.

Rack assembly 4 comprises two spaced pistons 5 (only one of which is shown) each having a hollow piston rod 6 which extends outwardly to an open end of the casing and houses a universal ball-joint 7 whereby the rack assembly 4 can be connected to a steerable road wheel 8 of a motor vehicle. Extending between the spaced pistons 5 is a rack 9 having rack teeth 10. The rack 9 is pivotally connected to each of the pistons 5 by means of a pivot pin 11 which engages in a bore 12 in the piston. A thrust washer 13 is interposed between each of the pistons 5 and the rack 9. The arrangement is such that the rack assembly 4 is free to rotate about the axis of pistons 5 and the rack 9 is free to rotate about the pivot pins 11, i.e. about an axis parallel with the axis of pistons 5. Also extending between the pistons 5 is a balancing bar 14 arranged diametrically opposite the rack 9. The balancing bar 14 is pivotally connected to each of the pistons 5 by means of a pivot pin 15 which engages in a bore 16 in the piston 5. A thrust washer 17 is interposed between each of the pistons 5 and the balancing bar 14. The thrust washers 13 interposed between pistons 5 and rack 9 allow of a small degree of axial displacement of rack 9. The pistons 5 are tied together by a tie bar 18 and nuts 19 (only one of which is shown) which make screw-threaded engagement with threaded end portions 20 of the tie bar 18. Each of the nuts 19 is housed within a hollow piston rod 6. In the illustrated embodiment the tie bar 18 is of hexagonal configuration in cross-section (see FIG. 1) and the rack 9 is shaped to partially embrace the tie bar. Sealing rings 21 are provided around the peripheries of pistons 5, between casing 1 and cylinder lining 3, between housing 1 and piston rods 6 and between piston rods 6 and nuts 19. Each ball joint comprises a seat portion 22 housed in a recess in the head of nut 19 and a seat portion 23 which makes screw-threaded engagement with a threaded counterbore of piston rod 6. A helical srping 24 acts on seat portion 22 to take-up any wear in the ball joint. A fused nylon locking strip 25 prevents inadvertent loosening of seat portion 23. A locking ring 26 force-fitted into an annular groove in the counterbore of piston rod 6 prevents loosening of seat portion 23 and nut 19 in the event of failure of locking strip 25.

A pinion 27, having pinion teeth 28 with which the teeth 10 of rack 9 mesh, is rotatably mounted in casing 1. Pinion 27 is supported by roller bearings 29 and thrust bearing 30, and is connected by means of steering column shaft 31, bevel gears 32, 33 and rotary control valve 34 to the steering wheel 35 of a motor vehicle so as to be rotatable thereby.

Toothed rack 9 is urged into meshing engagement with pinion 27 by a spring 36 which acts on a support member 37 for a pad 38 having a planar face 39 which makes sliding engagement with a face 40 of rack 9. Face 40 of rack 9 is substantially parallel with the teeth 10 thereof. Pad 39 has a hemispherical seat portion 41 which is received in a complementary seating 42 in support member 37 so that pad 39 can adjust to movements of rack 9. An oilway 43 is provided so that lubricant can be supplied to faces 39, 40.

It will readily be appreciated that since the rack assembly 4 is free to rotate about the axis of pistons 5 and since the rack 9 is mounted eccentrically of the pistons 5, the rack assembly 4 will tend to turn about the axis of pistons 5 axis under the influence of spring 36 to maintain the teeth 10 of rack 9 in meshing engagement with the teeth 28 of pinion 27. At the same time rack 9 is free to rotate about pivot pins 11 so that the teeth 10 of rack 9 will automatically align laterally with the teeth 28 of pinion 27. Any slight misalignment of the teeth 10 with teeth 28 in the axial direction of rack 9 will automatically be compensated for by the slight axial movement of rack 9 allowed by thrust washers 13.

Between each piston 5 and its adjacent end of the cylinder 2 is provided a port 44 whereby the interior of the cylinder 2 can be connected, in known manner, by way of rotary control valve 34 to a source of fluid under pressure. The rotary control valve 34 acts in response to turning of the steering wheel 35 to control the flow of fluid under pressure to one end or the other of cylinder 2 to provide the required power assistance.

It will be understood that the embodiment shown in the accompanying drawings has been selected simply for the purposes of illustration and that various modifications are possible. Thus, for example, the rotary control valve 34 could be connected direct to pinion 27, in which case steering column shaft 31 would connect rotary control valve 34 to steering wheel 35.

What is claimed is:

1. A power-assisted rack-and-pinion steering mechanism for a motor vehicle, the mechanism comprising a housing, a pinion rotatably mounted in the housing and adapted for connection to the steering control of a motor vehicle for rotation thereby, a rack assembly reciprocable within said housing and adapted for connection to the steerable road wheels of a motor vehicle to impart steering thereto, the rack assembly comprising two pistons spaced from one another and a toothed rack mounted between said pistons, the rack assembly being rotatable about the axis of said pistons to engage the teeth of the toothed rack with the pinion and the toothed rack being rotatable about an axis parallel with the axis of the pistons to align the teeth of the toothed rack with the teeth of the pinion, and means urging the toothed rack into engagement with the pinion.

2. A steering mechanism according to claim 1 wherein the toothed rack is pivotally connected to each of said pistons by way of a pivot pin inserted into a bore in the piston.

3. A steering mechanism according to claim 1, wherein a tie bar is provided which connects said pistons one with the other.

4. A steering mechanism according to claim 1, wherein a piston rod is associated with each said piston, said piston rods extending in opposite directions and being adapted for connection to the steerable road wheels of a motor vehicle.

5. A steering mechanism according to claim 1, wherein the means urging the toothed rack into engagement with the pinion comprises a pad having a planar face portion engaging a face portion of the toothed rack and a hemispherical seat portion, a support member having a hemispherical seating in which is received the seat portion of said pad, and a helical compression spring interposed between said support member and said housing.

6. A steering mechanism according to claim 1, wherein the toothed rack is capable of limited axial movement relative to said pistons.

7. A steering mechanism according to claim 6, wherein a thrust washer is interposed between each of said pistons and the toothed rack.

8. A steering mechanism according to claim 1, wherein a balancing bar is provided which extends between said pistons, the balancing bar being located diametrically opposite the toothed rack.

9. A steering mechanism according to claim 8, wherein a thrust washer is interposed between each of said pistons and the balancing bar.

10. A steering mechanism according to claim 1, comprising a hollow piston rod associated with each piston, a tie bar extending through apertures provided centrally of said pistons and through said hollow piston rods, and a nut housed in that end of each piston rod remote from its associated piston and making screw-threaded engagement with the adjacent end portion of said tie bar to connect said pistons together.

11. A steering mechanism according to claim 10, wherein the tie bar is of non-circular cross-section and extends through a complementary aperture in each piston, thereby preventing relative rotation between the pistons and the tie bar.

12. A steering mechanism according to claim 11, wherein the toothed rack has a cross-sectional configuration such that it partially embraces the tie bar.

* * * * *